Patented Feb. 15, 1944

2,341,594

UNITED STATES PATENT OFFICE 2,341,594

MANUFACTURE OF PREGNENDIONE FROM ISO-PREGNENOLONE AND INTERMEDIATES OBTAINED THEREBY

Adolf Butenandt, Berlin-Dahlem, Germany, assignor to Schering Corporation, Bloomfield, N. J., a corporation of New Jersey No Drawing. Application May 17, 1940, Serial No. 335,867. In Germany March 9, 1939

9 Claims. (Cl. 260—397.3)

This invention relates to a process for the manufacture of pregnendione from iso-pregnenolone, by way of iso-pregnendione as an intermediate.

In U. S. application Serial No. 182,322 filed December 29, 1937, which has issued as Patent No. 2,258,131, dated October 7, 1941, there is described a process for the manufacture of pregnendione of the formula $C_{21}H_{30}O_2$ wherein a so-called iso-pregnenolone is subjected to the action of chromic oxide in glacial acetic acid solution to convert the secondary alcohol group into a keto group.

Now, I have found that a so-called iso-pregnendione is obtained by subjecting the iso-pregnenolone to the oxidation process described in U. S. application Serial No. 145,824. Preferably the oxidation is carried out by means of cyclohexanone and aluminum iso-propylate, but other ketones and aldehydes as well as other metal alcoholates may likewise be used. On treating the 17-iso-pregnendione obtained thereby with acids, for instance, with hydrochloric acid, the well known pregnendione is formed.

The manufacture of iso-pregnendione, and of pregnendione, from said iso-pregnendione may be explained by the following example, without, however, limiting the invention to the same:

100 mgs. of 17-iso-pregnenolone are dissolved in 2 ccs. of cyclohexanone and boiled with 150 mgs. of aluminum iso-propylate in 10 ccs. of toluene for one hour. The reaction solution is then poured into water, the aluminum hydroxid precipitated is filtered off and washed with acetone. The filtrate is distilled to dryness in vacuum at 50° C. The residue yields from aqueous acetone a crystalline mass containing some oil. After recrystallizing the same from aqueous acetone there are obtained 40 mgs. of long needles, having a melting point of 135–140°. On repeated recrystallization from dilute alcohol the melting point of the iso-pregnendione increases to 145° C., whereby sintering occurs already at about 142° C. The ultra violet absorption spectrum shows a maximum at 243 mu=17,300 A.

8 mgs. of iso-pregnendione are heated in a mixture of 3 ccs. of alcohol and 0.3 cc. of hydrochloric acid (1N) for 15 minutes. Thereupon the solution is poured into water and extracted with ether. After evaporation of the ethereal solution the residue obtained is recrystallized from dilute methanol and yields 3 mgs. of pregnendione in the characteristic prisms of the α-form, having a melting point of 127–128° C. and $(\alpha)_D = +187°$. The mixed melting point of the same with the known pregnendione does not show any depression.

Instead of using the oxidation method described which gives very good yields of iso-pregnendione, also other methods may be employed, provided they take place in a non-acidic medium; for, in an acidic medium the oxidation of the 17-iso-pregnenolone yields directly the known pregnendione.

Of course, many changes and variations in the reaction conditions, the solvents used, the methods of working up and purifying the final product, the reaction temperature and duration, and so forth may be made by those skilled in the art in accordance with the principles set forth herein and in the claims annexed hereto.

What I claim is:

1. Process for the manufacture of iso-pregnendione from iso-pregnenolone, comprising subjecting iso-pregnenolone to the action of an oxidizing agent in a non-acidic medium.

2. Process according to claim 1, comprising subjecting iso-pregnenolone to the action of a metal alcoholate and an excess of a member of the group consisting of aldehyde and ketones.

3. Process according to claim 1, comprising subjecting iso-pregnenolone to the action of a metal alcoholate and an excess of a ketone.

4. Process according to claim 1, comprising subjecting iso-pregnenolone to the action of aluminum iso-propylate and cyclo-hexanone.

5. Process for converting iso-pregnendione into pregnendione, comprising treating the iso-pregnendione with an acidic agent.

6. Process according to claim 5, comprising treating iso-pregnendione with an acid.

7. Process according to claim 5, comprising treating iso-pregnendione with hydrochloric acid.

8. Process for the manufacture of pregnendione from iso-pregnenolone, comprising subjecting iso-pregnenolone to the action of an oxidizing agent in a non-acidic medium, and thereafter treating the iso-pregnendione so obtained with an acidic agent to convert the same to pregnendione.

9. Process for the manufacture of pregnendione from iso-pregnenolone, comprising subjecting iso-pregnenolone to the action of a metal alcoholate and an excess of a member of the group consisting of aldehydes and ketones, and thereafter treating the iso-pregnendione so obtained with a mineral acid to convert the same to pregnendione.

ADOLF BUTENANDT.